United States Patent [19]

Ikeda et al.

[11] Patent Number: 5,085,132
[45] Date of Patent: Feb. 4, 1992

[54] VENTILATING APPARATUS

[75] Inventors: Kazutoshi Ikeda, Inazawa; Hiroshi Kuriyama, Hashima; Tetsumi Ichioka, Iwakura; Ryouji Matsuoka, Nakashima, all of Japan

[73] Assignee: Toyoda Gosei Co., Ltd., Nishikasugai, Japan

[21] Appl. No.: 648,520

[22] Filed: Jan. 30, 1991

[30] Foreign Application Priority Data

Jan. 31, 1990 [JP] Japan .................. 2-8617[U]

[51] Int. Cl.⁵ .................................. B60H 3/06
[52] U.S. Cl. .......................... 98/2.11; 98/2.18
[58] Field of Search ......... 98/2.11, 2.18, 119; 55/163, 213, 385.2

[56] References Cited

U.S. PATENT DOCUMENTS

| | | | |
|---|---|---|---|
| 2,271,733 | 2/1942 | Clark | 55/505 X |
| 4,022,117 | 5/1977 | Mallian | 98/119 X |
| 4,537,115 | 8/1985 | Haesters | 98/2.18 |
| 4,741,256 | 5/1988 | Huang | 98/2.18 X |
| 4,963,094 | 10/1990 | Meyer | 55/313 X |

FOREIGN PATENT DOCUMENTS

| | | | |
|---|---|---|---|
| 58-63508 | 4/1983 | Japan | 98/2.18 |
| 59-63221 | 4/1984 | Japan | . |
| 62-9130 | 3/1987 | Japan | . |

Primary Examiner—Harold Joyce
Attorney, Agent, or Firm—Cushman, Darby & Cushman

[57] ABSTRACT

A ventilating apparatus includes a duct including an indoor air inlet port for taking in indoor air and an indoor air outlet port for discharging the indoor air to the outdoors, a one-way valve for opening the indoor air outlet port when discharging the indoor air to the outdoors, the one-way valve being disposed on the indoor air outlet port, and a filter for purifying contaminated outdoor air intruding from the outdoors by way of the indoor air outlet port. The indoor air can be discharged to the outdoors as smoothly as it is done with a conventional ventilating apparatus, and at the same time the contaminated outdoor air is filtered and thereafter introduced into a room as clean outdoor air. Hence, it is possible to prevent the inside of a room from being contaminated with contaminated outdoor air.

7 Claims, 4 Drawing Sheets

VENTILATING APPARATUS

BACKGROUND OF THE INVENTION

1. Field of the Invention

The present invention relates to ventilating apparatus. It particularly relates to an improvement in ventilating apparatus which works to discharge and ventilate contaminated indoor air in indoor living space such as an automobile room, a room of a building and the like, to the outdoors.

2. Description of Related Art

An automobile traveling on a bad road like the desert requires a high degree of air-tightness in order to prevent sand and the like from coming into the automobile. However, if the air-tightness is simply increased, passengers still suffer from an unpleasant feeling due to a sudden pressure increase in the automobile when a door is closed. Accordingly, automobiles are equipped with ventilating apparatus which flows air only in one direction, namely from inside of the automobile to the outdoors.

Conventional ventilating apparatus comprises a duct including an indoor air inlet port for receiving indoor air of an automobile room, an indoor air outlet port for discharging the indoor air to an outside of the automobile and a one-way valve, disposed on the indoor air outlet port, for opening the indoor air outlet port only when discharging the indoor air to the outside of the automobile room.

The one-way valve is connected to a wall surface forming the indoor air outlet port at one end thereof, and another end of the one-way valve is made swingable around a connection i.e., around the one end thereof. The one-way valve usually closes the indoor air outlet port by itself with its own weight. When a pressure difference between the inside and the outside of the automobile, for instance, a negative pressure generating and acting on the one-way valve during automobile traveling, reaches a magnitude overcoming the weight of the one-way valve, the other end of the one-way valve swings in a direction getting away from the indoor air outlet port, thereby opening the indoor air outlet port. Such a conventional technology is disclosed in Japanese Unexamined Patent Publication (KOKAI) No. 63221/1984 and Japanese Examined Utility Model Publication (KOKOKU) No. 9130/1987.

In the conventional ventilating apparatus, it has been required to discharge indoor air quickly when the indoor air is contaminated with cigarette smoke and the like. Accordingly, the weight of the one-way valve has been reduced in order to open the indoor air outlet port with a small pressure difference with ease and discharge the contaminated air in the automobile room efficiently. Nevertheless, when the weight of the one-way valve is reduced, deteriorated sealing occurs when the one-way valve closes the indoor air outlet opening. As a result, it is hard to close the indoor air outlet port securely with having a reduced weight one-way valve. Hence, contaminated outdoor air, or outdoor air containing fine sand, dust, smoke and the like, intrudes into the automobile room through clearances between the one-way valve and the indoor air outlet port.

SUMMARY OF THE INVENTION

It is therefore a primary object of the present invention to provide ventilating apparatus which overcomes the above drawbacks associating with conventional ventilating apparatus.

Namely, it is a further object of the present invention to provide ventilating apparatus which not only discharges the indoor air quickly but also prevents the foreign or contaminating materials contained in the outdoor air from intruding into the inside of an automobile.

DETAILED DESCRIPTION OF THE INVENTION

Figure 1:
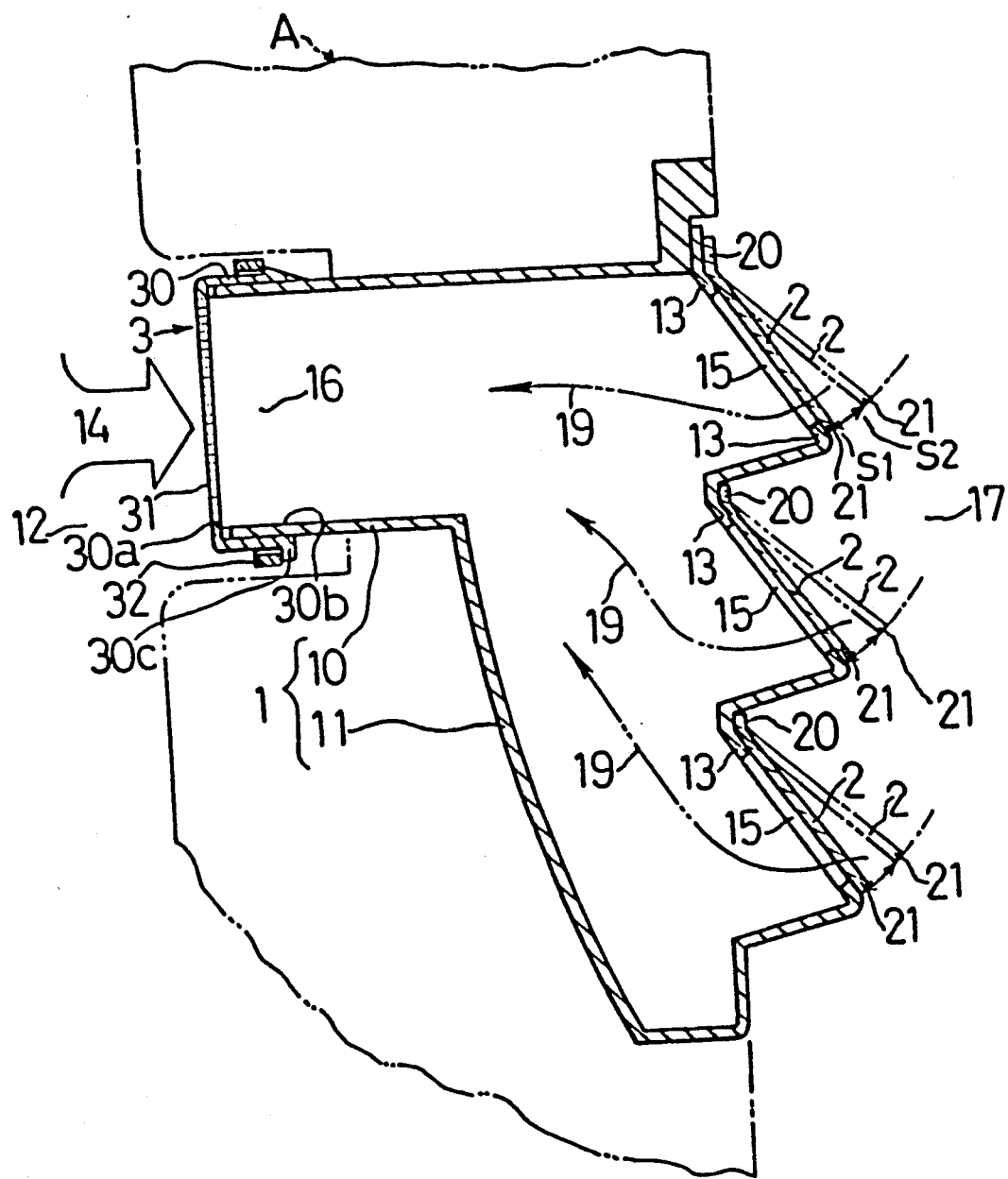
FIG. 1 is a vertical cross-sectional view illustrating a major portion of a first preferred embodiment of ventilating apparatus according to the present invention.

The above and other objects can be achieved by ventilating apparatus constructed according to the present invention, in which there is:

a duct including an indoor air inlet port for taking indoor air in and an indoor air outlet port for discharging the indoor air to the outdoors;

a one-way valve for opening the indoor air outlet port when discharging the indoor air to the outdoors, the one-way valve being disposed on the indoor air outlet port; and a filter for purifying contaminated outdoor air intruding from the outdoors by way of the indoor air outlet port.

The duct is a tubular-shaped body, and it is provided with the indoor air inlet port for taking the indoor air in and the indoor air outlet port for discharging the indoor air to the outdoors The duct can be made of synthetic resin, metal or the like.

Shapes of the indoor air inlet port and the indoor air outlet port can be rectangular, circular or the like, and they are determined as a respective case requires Numbers of the indoor air inlet ports and the indoor air outlet ports to be formed and opening areas thereof can be determined as a respective case requires.

The filter purifies the contaminated outdoor air intruding from the outdoors by way of the indoor air outlet port. It is preferable to install the filter to the duct detachably. Further, a conventional filter can be employed therefor, and the filter shape can be selected from various shapes as a respective case requires. For instance, the filter can be one which is installed around the indoor air inlet port in a manner covering the indoor air inlet port of the duct on an indoor side of an automobile. Or the filter can be disposed on a discharging path between the indoor air inlet port and the indoor air outlet port of the duct. The filter is slidably and detachably installed thereon perpendicularly to or at an inclination with respect to an axial direction of the indoor air inlet port. The filter can include a frame member and a filter member formed integrally with the frame member. The frame member can be installed detachably to the duct. The filter member filters the contaminated outdoor air thereby removing the foreign or contaminating materials, and can be made of a fibrous substance, a porous substance or the like.

In addition, it is preferable to employ a foamed substance like sponge for the filter material. It is more preferable to employ a material for the filter member which lets air pass therethrough only from the inside of a room to the outside thereof.

The one-way valve is disposed on the indoor air outlet port, and opens the indoor air outlet port when discharging the indoor air to the outdoors. The one-way valve can be connected, for instance, to a wall surface forming the indoor air outlet port of the duct, and an opposite end of the one-way valve can be made swingable around a connection, i.e,, around the one end for opening and closing the indoor air outlet port. The one-way valve can be similar to a conventional one.

Thus, the duct of the ventilating apparatus according to the present invention includes a filter which purifies the contaminated outdoor air intruding from the outdoors by way of the indoor air outlet port. Consequently, when contaminated air has flowed backward through the indoor air outlet port which is opened by the one-way valve, and even when contaminated air has intruded through clearances between the one-way valve and the indoor air outlet port which are sealed incompletely, the contaminated air will be purified by the filter before being introduced into the inside of the room.

Further, since the filter is installed detachably to the duct, it is possible to replace the filter with a new one after a predetermined period of service, and accordingly it is possible to maintain the function of purifying the contaminated outdoor air intruding from the outdoors. When the indoor air is contaminated with cigarette smoking and the like, it is needless to say that the ventilating apparatus according to the present invention can discharge the contaminated indoor air through the indoor air outlet port opened by the one-way valve to the outdoors in a manner identical with that of the conventional ventilating apparatus.

In addition when an automobile traveling in the desert is equipped with the ventilating apparatus according to the present invention, since the indoor air can be discharged smoothly by way of the filter and the indoor air outlet port, no sudden pressure increase occurs in the automobile room when a door is closed. Even if the outdoor air has intruded through the indoor air outlet port, sand and the like contained in the outdoor air is filtered by the filter and accordingly no sand can intrude into the automobile room. Hence, the indoor air in the automobile can be kept purified, and an apparent air-tightness can be maintained at a high degree.

Thus, the ventilating apparatus according to the present invention can fully carry out is excellent performance in spite of its extremely simple arrangement.

PREFERRED EMBODIMENTS OF THE INVENTION

The present invention having been described, further understanding can be developed by reference to certain specific preferred embodiments which are provided herein for purposes of illustration only.

EXAMPLE 1

As illustrated in FIG. 1, a first preferred embodiment of ventilating apparatus according to the present invention includes a duct installed to a body of an automobile "A," three one-way valves 2 and a filter 3.

The duct 1 is made of resin. It includes a horizontal tube-shaped portion 10 and a vertical tube-shaped portion 11 communicating with the horizontal tube-shaped portion 10 and extending in a substantially vertical direction. The horizontal tube-shaped portion 10 includes an indoor air inlet port 16 for taking in indoor air 14. The vertical tube-shaped portion 11 includes three inclined wall surfaces 13 disposed at an inclination angle of approximately 60°, and on an opposite side, with respect to the indoor air inlet port 16. The inclined wall surface 13 includes three indoor air outlet ports 15 formed therein for discharging the indoor air 14 to the outdoors 17.

The three one-way valves 2 are made of synthetic rubber, and formed in a plate shape having an area greater than the opening area of the respective indoor air outlet port 15. The one-way valves 2 are disposed on the outer side of duct 1, i.e., on a side of the outdoors 17, in a manner covering the indoor air outlet ports 15. One end 20 of the one-way valves 2 is connected to a predetermined part of the inclined wall surfaces 13 constituting the indoor air outlet ports 15 so that the one-way valves 2 can open the indoor air outlet ports 15 when discharging the indoor air 14 in an automobile room 12 to the outdoors 17. Namely, these one-way valves 2 operate in the following manner: the opposite end 21 of the one-way valves 2 approaches and comes into contact with the inclined wall surface 15, pivoting around end 20 as an fulcrum. Accordingly, the one-way valves 2 can move by themselves due to their own weight in a direction closing the indoor air outlet ports 15 (i.e., in a direction of the arrow "S1" of FIG. 1). When the pressure difference between the automobile room 12 and the outdoors 17 (or a negative pressure acting on the one-way valves 2) reaches a magnitude overcoming the weight of the one-way valves 2, the other end 21 of the one-way valves 2 leaves the inclined wall surface 13 constituting the indoor air outlet port 15, pivoting around the fulcrum end 20. Accordingly, the one-way valves 2 can move in a direction opening the indoor air outlet ports 15 (i.e."in a direction of the arrow "S2" of FIG. 1).

The filter 3 includes a tube-shaped frame member 30, a filter member 31 and a ring-shaped clamp member 32. The tube-shaped frame member 30 is a tubular body made of resin. Further, at one opening 30a of the tube-shaped frame member 30 in an axial direction, the filter member 31 is formed integrally with the tube-shaped frame member 30. Furthermore, at another opening 30b of the tube-shaped frame member 30 in an axial direction, a ring-shaped engaging projection 30c is formed on an outer peripheral surface of the tube-shaped frame member 30, thereby engaging with the ring-shaped clamp member 32.

Filter member 31 is made of a urethane sponge. The ring-shaped clamp member 32 is a ring, which is cut off at a predetermined portion and made of resin, and has an inner diameter smaller than an outer diameter of the tube-shaped frame member 30.

The tube-shaped frame member 30 of the thus arranged filter 3 is first installed onto an outer peripheral surface of the horizontal tube-shaped portion 10 of the duct 1. Then, the engaging projection 30c of the tube-shaped frame member 30 is engaged with the ring-shaped clamp member 32 in order to fix the filter 3 on the horizontal tube-shaped portion 10 of the duct 1.

In the thus arranged first preferred embodiment of the ventilating apparatus according to the present invention, even when contaminated air 19 of the outdoors 17 intrudes into the inside of the duct 1 through the indoor air outlet ports 15 and through clearances between the one-way valves 2 and the inclined wall surfaces 13, the foreign or contaminating materials contained in the contaminated air 19 is filtered out with the filter member 31 of the filter 3. Hence, the contaminated air 19 is purified by the filter member 31 of the filter 3 and thereafter flows into the automobile room 12. As a result, the indoor air 14 of the automobile room 12 has been prevented from being contaminated with the contaminated air 19 intruding from the outdoors 17.

In addition, after a predetermined period of service, the filter 3 of the first preferred embodiment can be replaced with a new one by simply disengaging the ring-shaped clamp member 32 from the engaging projection 30c of the tube-shaped frame member 30. Accordingly, the purifying function of the filter 3 can always be kept at an optimum level.

EXAMPLE 2

Figure 2:
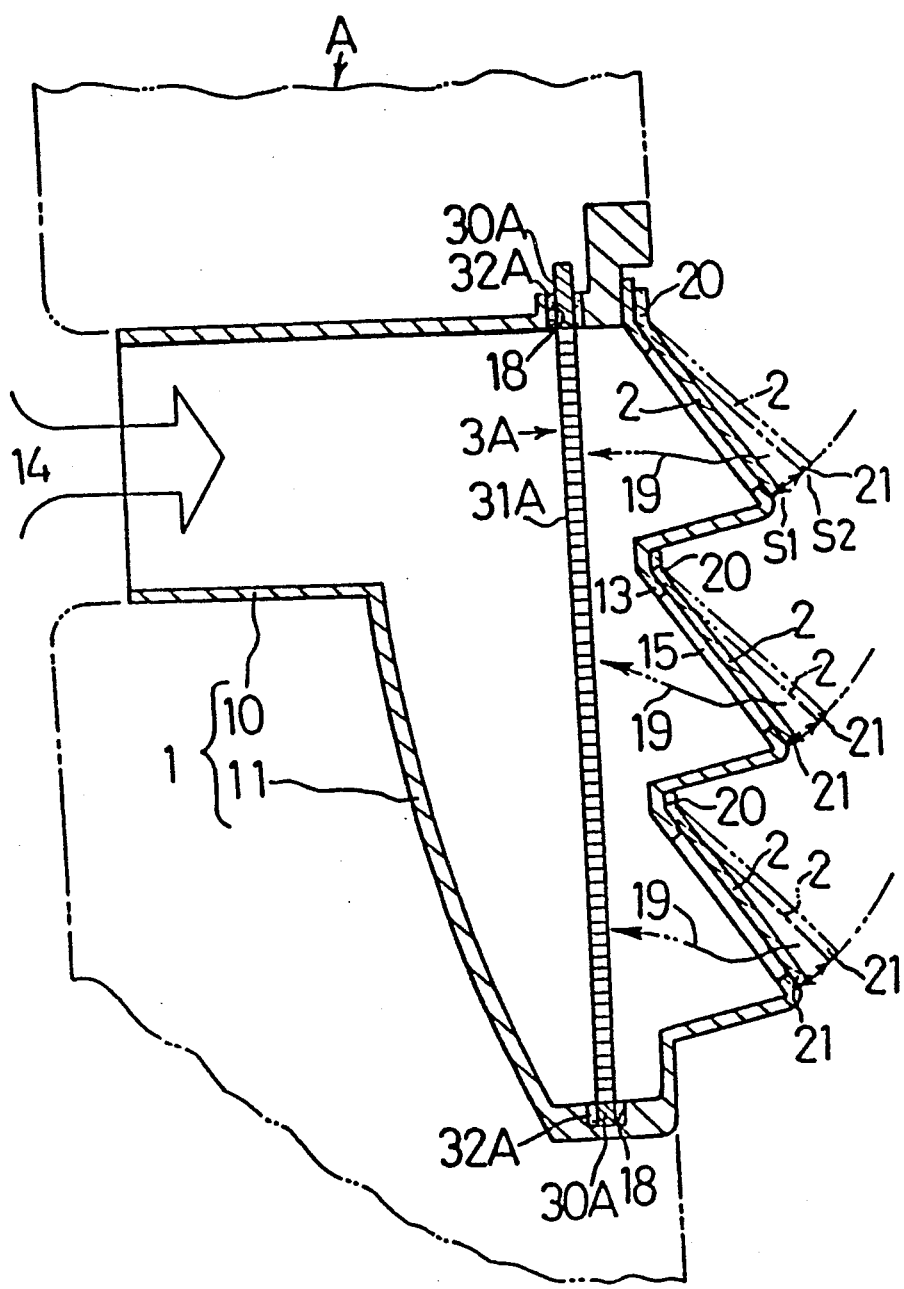
FIG. 2 is a vertical cross-sectional view illustrating a major portion of a second preferred embodiment of ventilating apparatus according to the present invention.

As illustrated in FIG. 2, a second preferred embodiment of ventilating apparatus according to the present invention includes a filter 3A. The filter 3A is disposed detachably in the vertical tube-shaped portion 11 of duct 1 on the side adjacent the three indoor air outlet ports 15.

When molding the duct 1, guide grooves 18 are formed on the top and bottom surfaces of the vertical tube-shaped portion 11 of the duct 1 in a direction perpendicular to an axial direction of the horizontal tube-shaped portion 10. Filter 3A includes a frame member 30A made of resin, a filter member 31A made of a urethane sponge, and a seal member 32A which is an elastic body such as rubber or sponge. The frame member 30A is formed as a plate-shaped body whose central portion is cut out in a manner leaving its peripheral portion as it is. The filter member 31A is disposed in the cut-out central portion of the frame member 30A in a manner opposing the three indoor air outlet ports 15. The seal member 32A is disposed around the frame member 30A and sets elastically in the guide grooves 18 formed on the top and bottom surfaces of the vertical tube-shaped portion 11 of the duct 1. The filter 3A engages with the guide grooves 18 at the frame member 30A via the seal member 32A. Accordingly, the filter 3A is disposed in the vertical tube-shaped portion 11 of the duct 1 in a slidable, detachable and replaceable manner. Air inevitably passes through the filter member 31A and is purified since the filter member and seal prevent sand and the like from passing therethrough. Seal member 32A also prevents noise that would otherwise result from frame member 30A rettling in the guide grooves 18.

Other than the above-mentioned arrangements, the second preferred embodiment is similar to the first preferred embodiment.

In the second preferred embodiment of the ventilating apparatus according to the present invention, since the filter member 31A of the filter 3A has an increased surface area greater than that of the filter member 31 of the filter 3 of the first preferred embodiment, the filter 31A can carry out its purifying function for a longer period of time. As a result, a cycle for replacing the filter 31A can be extended and labor therefor can be reduced.

EXAMPLE 3

Figure 3:
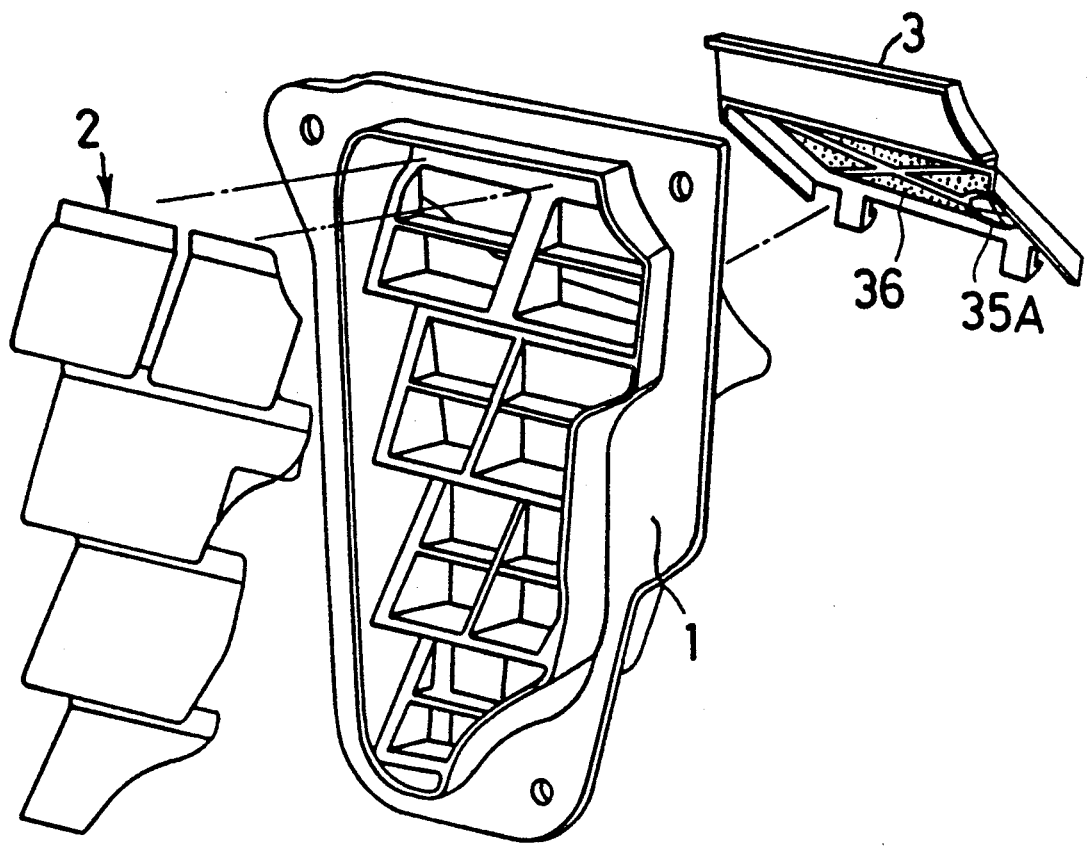
FIG. 3 is a perspective view illustrating an arrangement of a third preferred embodiment of ventilating apparatus according to the present invention.
Figure 4:
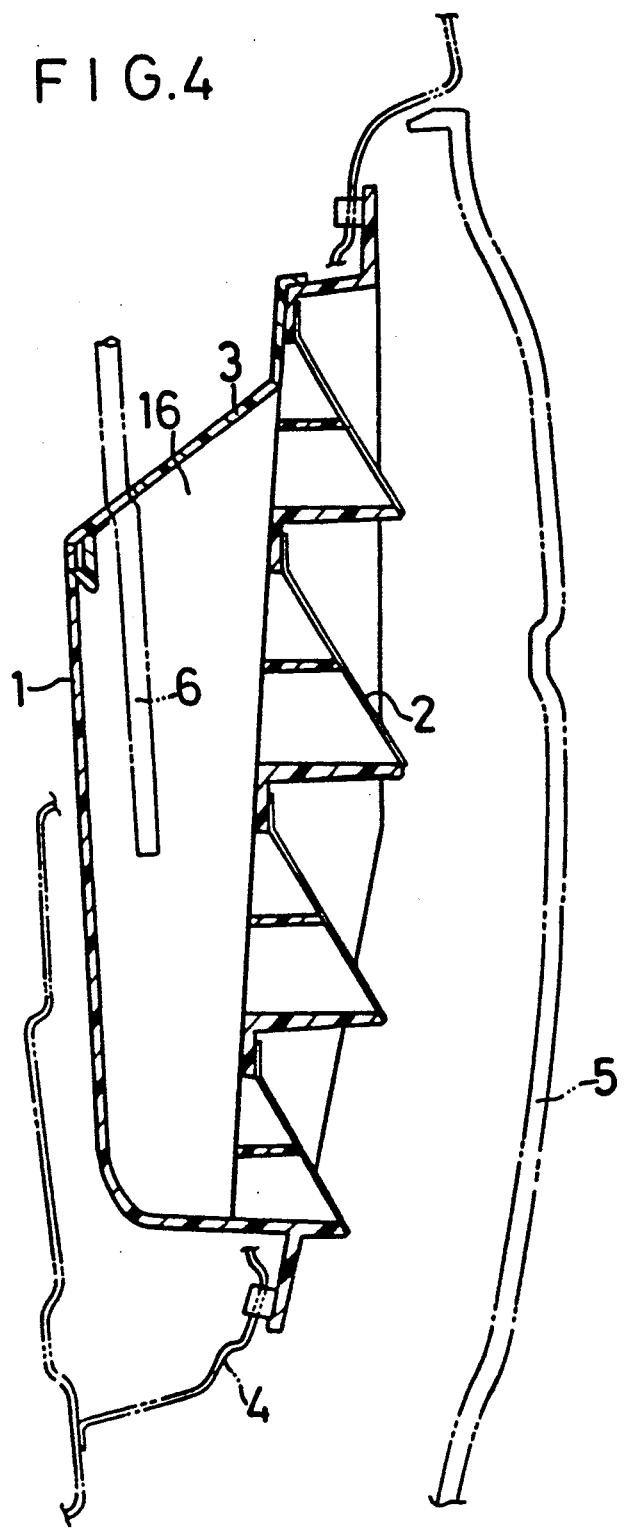
FIG. 4 is a vertical cross-sectional view illustrating the third preferred embodiment.

As illustrated in FIGS. 3 and 4, a third preferred embodiment of ventilating apparatus according to the present invention includes a duct 1, five one-way valves 2 and a filter 3. The filter 3 is held detachably to an indoor air inlet port 16 disposed at a top portion of the duct 1 And then, as illustrated in FIG. 4, the whole duct 1 is disposed through an opening of a quarter panel 4, and fixed on an outer surface of the quarter panel 4. Accordingly, the one-way valves 2 discharge indoor air flowing through the indoor air inlet port 16 to a space between the quarter panel 4 and a bumper cover 5.

Figure 5:
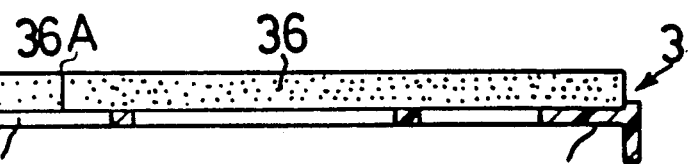
FIG. 5 is a cross-sectional view of a filter of the third preferred embodiment.
Figure 6:
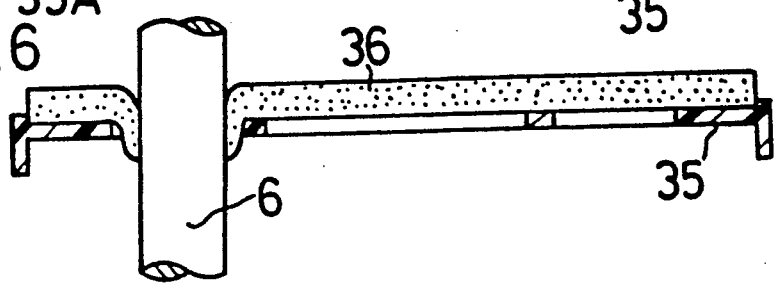
FIG. 6 is a cross-sectional view of the filter of the third preferred embodiment with a drain pipe disposed therein.

In the third preferred embodiment of the ventilating apparatus according to the present invention, the filter 3 includes a frame member 35 and a sponge-like filter member 36. As illustrated in FIG. 5, a pipe hole 35A is made in the frame member 35. Also in the filter member 36, a slit 36A is made in a cross-like shape at a position corresponding to the pipe hole 35A. Further, a drain pipe 6 is disposed in the filter 3 held to the duct 1. Namely, the drain pipe 6 is inserted into the slit 36A and the pipe hole 35A from a side of an automobile room, thereby discharging water coming from a sun roof into the duct 1. Here, the drain pipe 6 is held by the elasticity of the filter member 36.

Hence, in the third preferred embodiment of the ventilating apparatus according to the present invention, the filter 3 has a filtering or purifying function similar to those of the filters 3 and 3A of the first and second preferred embodiments and at the same time it works as a member for holding the drain pipe 6. When the drain pipe 6 is not in operation, the filter member 36 is recovered to its predetermined or original shape by its elasticity, and the slit 36A is put into the closed state. Therefore, there is no fear of the filtering or purifying function of the filter 3 deteriorating.

The present invention having been described, it will be appreciated by one of ordinary skill in the art that various modifications can be made within the scope of the following claims.

What is claimed is:

1. A duct including an indoor air inlet port for taking in indoor air, said indoor air inlet port communicating with an inside of an automobile room, and an indoor air outlet port for discharging said indoor air to an outside of said automobile room, said indoor air outlet port communicating with said outside of said automobile room;

a one-way valve fixed at one end thereof to an upper part of said indoor air outlet port, an opposite end of said one-way valve being swingable around said one end for opening and closing said indoor air outlet port, said opposite end of said one-way valve moving away from a peripheral part of said indoor air outlet port for opening said indoor air outlet port when discharging said indoor air to said outside of said automobile room; and a filter for purifying contaminated outdoor air intruding from said outside of said automobile room by way of said indoor air outlet port.

2. The ventilating apparatus according to claim 1, wherein said filter covers said indoor air inlet port of said duct.

3. The ventilating apparatus according to claim 1, wherein said filter includes a frame member and a filter member held to said frame member, and is held detachably to said duct.

4. The ventilating apparatus according to claim 1, wherein said one-way valve lets air flow of said indoor air pass therethrough only from said inside of said automobile room to said outside of said automobile room.

5. A ventilating apparatus comprising:
- a duct including an indoor air inlet port for taking in indoor air, said indoor air inlet port communicating with an inside of an automobile room and an indoor air outlet port for discharging said indoor air to an outside of said automobile room, said indoor air outlet port communicating with said outside of said automobile room;
- a one-way valve fixed to an upper part of said indoor air outlet port at one end thereof, an opposite end of said one-way valve being swingable around said one end for opening and closing said indoor air outlet port, said opposite end of said one-way valve moving away from a peripheral part of said indoor air outlet port for opening said indoor air outlet port when discharging said indoor air to said outside of said automobile; and
- a sponge-like filter held to said indoor air inlet port and having a slit in which a drain pipe is disposed, said drain pipe extending from said inside of said automobile room to an inside of said duct.

6. The ventilating apparatus according to claim 5, wherein said filter includes a frame member and a filter member held to said frame member, and is held detachably to said duct.

7. The ventilating apparatus according to claim 6 wherein said frame member has a pipe hole at a position corresponding to said slit of said filter member, and said drain pipe is disposed and held in said slit and said pipe hole by elasticity of said filter member.

* * * * *